United States Patent [19]
Darley et al.

[11] Patent Number: 5,115,408
[45] Date of Patent: May 19, 1992

[54] HIGH SPEED MULTIPLIER

[75] Inventors: Henry M. Darley, Plano; Jeffrey A. Niehaus, Dallas; Kevin M. Ovens, Garland, all of Tex.

[73] Assignee: Texas Instruments Incorporated, Dallas, Tex.

[21] Appl. No.: 652,241

[22] Filed: Feb. 5, 1991

Related U.S. Application Data

[63] Continuation of Ser. No. 418,708, Oct. 3, 1989, abandoned, which is a continuation of Ser. No. 149,779, Jan. 29, 1988, abandoned.

[51] Int. Cl.⁵ .................. G06F 7/52; G06F 7/38
[52] U.S. Cl. .................. 364/754; 364/746.2
[58] Field of Search .......................... 364/754

[56] References Cited

U.S. PATENT DOCUMENTS

| | | | |
|---|---|---|---|
| 4,498,177 | 2/1985 | Larson | 364/783 |
| 4,628,472 | 12/1986 | Fensch | 364/759 |
| 4,718,031 | 1/1988 | Nukiyama | 364/754 |
| 4,918,639 | 4/1990 | Schwarz et al. | 364/754 |

OTHER PUBLICATIONS

N. Takagi et al., "High-Speed VLSI Multiplication Algorithm with a Redundant Binary Addition Tree", IEEE Trans. on Computers, vol. C-34, No. 9, Sep. 1985, pp. 789-796.
1987 IEEE International Conference on Computer Design: VLSI in Computers & Processors, IEEE Catalog No. 87CH2473-7, ISBN 0-8186-0802-1, ICCD '87 Oct. 5-Oct. 8, 1987.
IBM Technical Disclosure Bulletin, vol. 27, No. 11, Apr. 1985, Title: Improved Approach to the Use of Booth's Multiplication Algorithm.
Binary-Compatible Signed-Digit Arithmetic, Proceedings of the fall joint computer conference San Francisco, Oct. 1964, Baltimore enz. Spartan Books 1964, A.F.I.P.S. conference proceedings vol. 26 part. 1, 663/672, zie boekencat.

*Primary Examiner*—Long T. Nguyen
*Attorney, Agent, or Firm*—Richard B. Havill; Lawrence J. Bassuk; Richard L. Donaldson

[57] ABSTRACT

A multiplying circuit (10) receives a multiplicand A and multiplies it by multiplier B. An Octal recoder (18) recodes the multiplier B into octal digits having a value from 4 to −4. A tripling generator determines the product of three times the multipicand. Partial product generators (22a-h) connected to the Octal recoder multiplex between the multiplicand A and the 3*A product, and include shifter and inverter circuitry to generate the partial products. Signed digit adders (24a-d, 26a-b and 28) add the partial products.

7 Claims, 1 Drawing Sheet

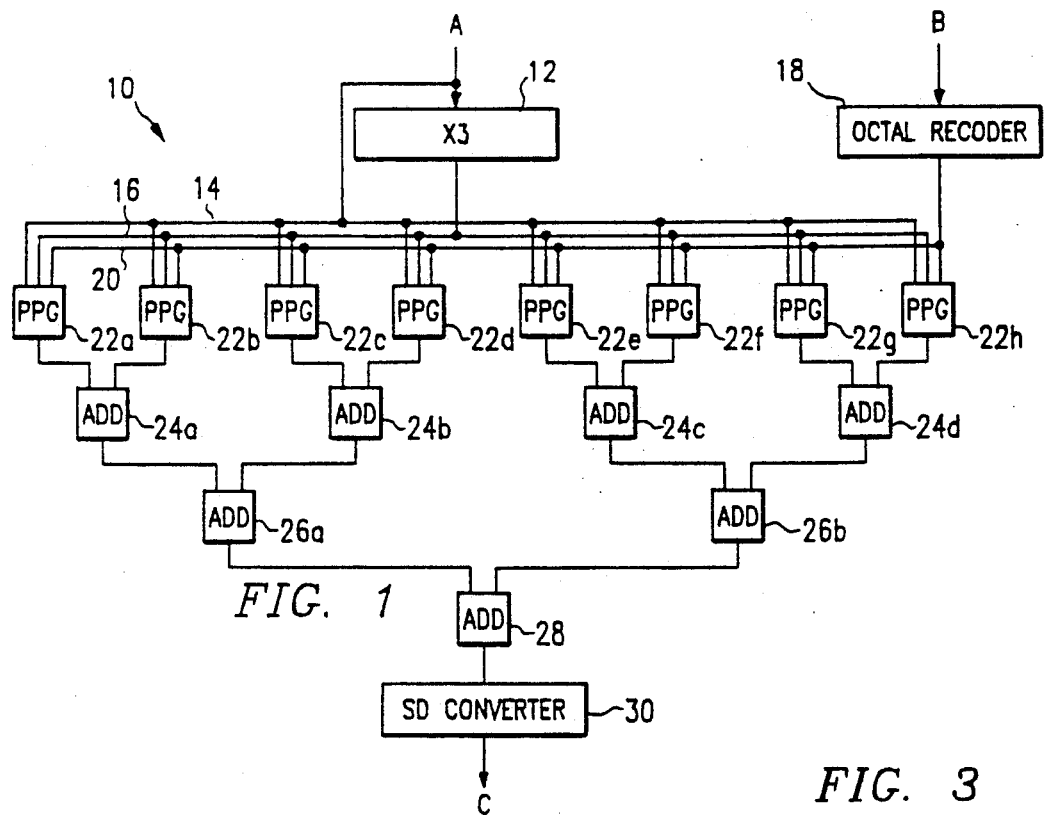
FIG. 1
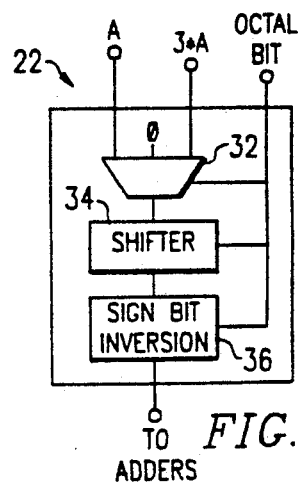
FIG. 3
FIG. 2
FIG. 4

HIGH SPEED MULTIPLIER

This application is a continuation of application Ser. No. 07/418,708, filed Oct. 3, 1989, abandoned, which is a continuation of application Ser. No. 07/149,779, filed Jan. 29, 1988, abandoned.

RELATED APPLICATION

"FLOATING POINT PROCESSOR ARCHITECTURE", by Michael Caulkins Gill et al., filed concurrently herewith, Serial No. 149,780, U.S. Pat. No. 4,916,651 issued Apr. 10, 1990.

"FLOATING POINT/INTEGER PROCESSOR WITH DIVIDE AND SQUARE ROOT FUNCTIONS", by Henry Merrick Darley et al., filed concurrently herewith, Ser. No. 150,363, U.S. Pat. No.4,878,190 issued Oct. 31, 1989.

TECHNICAL FIELD OF THE INVENTION

This invention pertains in general to integrated circuits, and more particularly to a high speed multiplier circuit having a small layout area.

BACKGROUND OF THE INVENTION

High speed computation is a critical design factor in many systems, such as computers, signal processors, and process controllers. These systems increasingly rely on LSI integrated circuits to perform the multiplication functions. The most critical design parameter for the multiplication circuits is the speed at which the multiplication is performed; but also of great importance is the silicon area required for the circuit implementation and the ease of the layout of the circuit design.

Previously developed high speed multipliers employ a Booth-Wallace tree parallel array approach. The Booth technique recodes one operand as a signed digit radix four number. The partial products of the multiplication are formed by multiplying the radix four digit times the second operand. The resultant partial products from the multiplication are reduced approximately in half from a binary parallel array, because the radix four representation contains half as many digits as the binary representation.

The partial products can be further reduced by Octal recoding, wherein a signed digit radix eight number (each digit comprises three bits) is used. The Octal recoding reduces the number of partial products by two-thirds; however, the technique is heretofore not practical because it requires partial products that are multiples of three. Since multiples of three cannot be generated simply by a shift, but require a shift and an add operation, the advantage of the reduced partial products is negated by the additional time for the add operation.

A Wallace tree approach is used in high speed multipliers because it permits adding partial products in parallel rather than as a linear sequence in the pure parallel array approach. The major disadvantage of the Wallace tree is the complex routing which is required to calculate separate sum and carry streams. The design and layout of the Wallace tree circuit is even more complex due to the fact that the number of digits in each column of the partial product array changes with the place value of the digit. Thus, Wallace tree approaches tend to be routing intensive and have little iterative structure.

Recently, a binary tree approach has been developed wherein a signed digit redundant logic representation of numbers is employed along with a radix two operand. This approach is described in N. Takagi, H. Yasuura, and S. Yajima, *High-Speed VLSI Multiplication Algorithm with a Redundant Binary Addition tree*, IEEE Transactions On Computers, Vol. C-34, No. 9, Sept., 1985, pp. 789-795. The proposed multiplier described in the article uses a signed digit representation in which each digit may be a "0", "1", or "−1". The signed digit representation allows parallel addition of two N-digit numbers performed in a constant time independent of the number of digits in the number without carry propagation. Because the signed digit representation uses two bits for each digit, the addition is more complex, therefore slower. However, the layout of the circuit is simpler than the Wallace tree layout, and the slowness in speed is somewhat offset by the avoidance of the carry chain.

Thus, a need has arisen in the industry for a high speed multiplier having a less complex layout to reduce chip area size, while not sacrificing the speed of the multiplication.

SUMMARY OF THE INVENTION

In accordance with the present invention, a multiplier is provided for use in an integrated circuit which substantially eliminates or prevents the disadvantages and problems associated with prior multiplier circuits.

The multiplier of the present invention recodes a multiplier number representation into an octal representation, each digit of the octal representation having an integer value between four and minus four. A value equal to three times the multiplicand is generated before forming the partial products. Partial product generators provide the partial products by multiplexing between the multiplicand and the value by multiplying the generated multiplicand by three, in response to the magnitude of the multiplier represented as an octal digit. Multiplication by two and four are produced by shifting the multiplicand one or two bit places, respectively. Inversion circuitry is provided for a negative multiplicand. The octal representation of the multiplier operand provides the technical advantage of decreasing the number of partial products, and therefore, the time necessary to add the partial products.

In an important aspect of the present invention, addition is performed using signed digit addition, wherein each digit is represented by a one, zero or minus one. The signed digit addition provides the technical advantage of a similar layout for each part of the adding section, requiring less chip area than other adding circuits.

BRIEF DESCRIPTION OF THE DRAWINGS

For a more complete understanding of the present invention and the advantages thereof, reference is now made to the following description now taken in conjunction with the accompanying drawings in which:

FIG. 1 is a functional block diagram of the multiplier of the present invention;

FIG. 2 is a chart illustrating the formation of signed digit numbers;

FIG. 3 is an example of addition using signed digit numbers; and

FIG. 4 is a functional block diagram of the partial product generators of FIG. 1.

DETAILED DESCRIPTION OF THE INVENTION

The preferred embodiment of the present invention is best understood by referring to FIGS. 1-4 of the drawings, like numerals being used for like and corresponding parts of the various drawings.

FIG. 1 illustrates a functional block diagram of the multiplier circuit 10 of the present invention. The first operand, a multiplicand A is applied to the input of a tripling generator 12, which produces an output equal to the multiplicand A times three, and to a first bus 14. The output of the tripling generator 12 is connected to a second bus 16. The second operand, the multiplier B, is applied to an Octal recoder 18, the output of which is connected to a third bus 20. The first, second and third buses are each connected in multiple to respective inputs to a plurality of partial product generators 22a-h. The number of partial product generators 22 will be determined by the bit length of the operands A and B; in this case, an operand bit length of 24 is assumed, requiring eight partial product generators.

Pairs of the partial product generators 22 are connected to first level adders 24a-d. Partial product generators 22a-b are connected to first level adder 24a, partial product generators 22c-d are connected to first level adder 24b, partial product generators 22e-f are connected to first level adder 24c and partial product generators 22g-h are connected to first level adder 24d. The outputs of the first level adders are paired and connected to second level adders 26a-b: the outputs of first level adders 24a-b are connected to second level adder 26a and the outputs of first level adders 24c-d are connected to second level adder 26b. The outputs of the second level adders 26a-b are connected to the third level adder 28, the output of which is connected to a signed digit converter 30 which may be used to convert the signed digit output of the adder 28 into a binary or two's complement result, if desired.

The first operand, a multiplicand A, should be in signed digit form or conventional binary magnitude representation. This allows for hardware savings in the design of the tripling generator 12. In a signed digit number, each digit is represented by a "1", "0", or "−1". Typically, this is implemented using two bits for each digit, a first bit indicating the magnitude of the digit, i.e., zero or one, and the second bit indicating the sign of the digit, i.e., plus or minus, if the digit has a magnitude of one.

The signed digit representation provides for redundant expressions for a given number. For example, the number three may be represented by the expressions 0011, 010T, 01T1, 1T0T or 1TT1, where T represents −1. The redundancy of the signed digit number system allows two numbers to be added in parallel without a rippled carry.

It should be noted that all binary numbers are also signed digit representations since they may be regarded as having positive sign bits. Therefore, binary numbers need not be converted to a signed digit representation prior to addition.

The use of signed digit representation simplifies the layout of the addition circuitry providing the technical advantage of a smaller chip area required therefor.

The second operand, the multiplier B, is input to the Octal recoder 18 which recodes the operand into a recoded multiplier B' in which groups of three bits are recoded into single digits having a value in the set [4, 3, 2, 1, 0, −1, −2, −3, −4]. A twenty-four bit binary number can be transformed into an octally recoded number representation having eight digits, each digit having an integer value between four and minus four.

The recoding can be accomplished as described in connection with TABLE I below. $B_i$ are the individual bits of the binary number being recoded, where "i" ranges between zero and N. The recoded number $R_k$ can be determined using TABLE I for i=0, 3, 6, 9,... and k=i/3. For example, B=101101001 would correspond to $R_2$=−2, $R_1$=−3 and $R_0$=1. The table assumes the number is 3N-bits long and is a 2's complement number (i.e. a leading "one" bit indicates a negative number).

TABLE I

| Recoding Binary to Octal | | | | |
|---|---|---|---|---|
| $B_{i+2}$ | $B_{i+1}$ | $B_i$ | $B_{i-1}$ | $R_k$ |
| 0 | 0 | 0 | 0 | 0 |
| 0 | 0 | 0 | 1 | 1 |
| 0 | 0 | 1 | 0 | 1 |
| 0 | 0 | 1 | 1 | 2 |
| 0 | 1 | 0 | 0 | 2 |
| 0 | 1 | 0 | 1 | 3 |
| 0 | 1 | 1 | 0 | 3 |
| 0 | 1 | 1 | 1 | 4 |
| 1 | 0 | 0 | 0 | −4 |
| 1 | 0 | 0 | 1 | −3 |
| 1 | 0 | 1 | 0 | −3 |
| 1 | 0 | 1 | 1 | −2 |
| 1 | 1 | 0 | 0 | −2 |
| 1 | 1 | 0 | 1 | −1 |
| 1 | 1 | 1 | 0 | −1 |
| 1 | 1 | 1 | 1 | 0 |

The output of the Octal recoder 18 may comprise six lines for each digit, five of the lines indicating the magnitude of the digit, and the sixth line indicating the sign of the digit.

Each digit of the recoded multiplier B' multiplies the multiplicand A to produce a respective partial product. In the illustrated embodiment, the eight digits of the recoded multiplier B' would each produce a partial product. Multiplication by four or two may be accomplished by shifting the multiplicand A to the left by two or one places, respectively. Multiplication by minus four or minus two may be accomplished by shifting the multiplicand A to the left by two or one places, and inverting the sign bits corresponding to the nonzero magnitude bits. Multiplication by one is accomplished by passing the multiplicand A unshifted. Multiplication by zero results in a product of zero.

Multiplication by three requires both a shift and an add. In the multiplier 10, multiplication by three is provided by the tripling generator 12 which provides an output of A*3, which is available for use in computing any of the partial products. Multiplication by minus three is accomplished by inverting the sign bits of the number output from the tripling generator 12.

Each digit of the recoded multiplier B' output by the Octal recoder 18 is applied to a respective partial product generator 22a-h. Each of the partial product generators 22a-h is essentially a multiplexer having shifting and inverting capabilities. If the recoded multiplier digit from the Octal recoder 18 present on the portion of the third bus 20 connected to a particular partial product generator 22a-h is a 4, 2, −2, or −4, the multiplicand A present on the first bus 14 is shifted appropriately, and the appropriate sign bits are inverted if the recoded multiplier digit is negative. If the recoded multiplier digit is a one or a minus one, the partial product generator 22a–h outputs a value equal to the multiplicand on the first bus 14, inverting the sign bits as appropriate. If the recoded multiplier digit is a zero, the partial product generator 22a–h outputs a zero. If the recoded multiplier digit is a three or a minus three, the partial product generator 22a–h outputs the value being applied on the second bus 16, inverting the appropriate sign bits if the recoded multiplier digit is a minus three.

The first, second and third level adders 24a–d, 26a–b, and 28, are signed digit adders, capable of performing parallel addition without carry propagation. Signed digit addition is described in detail in an N. Takagi, H. Yasuura, and S. Yajima, *High-Speed VLSI Multiplication Algorithm with a Redundant Binary Addition Tree*, IEEE Transactions On Computers, Vol. C-34, No. 9, Sept., 1985, pp. 789–795, which is incorporated by reference herein.

FIG. 2 illustrates a table describing conversion of the operands into an intermediate sum and an intermediate carry. After conversion, the intermediate sum and intermediate carry are added without generating a carry. As an example, "X" is chosen as 011T0110 and "Y" is chosen as 10T1T10T. From FIG. 2, the intermediate sum can be determined as T100T01T, and the carry sum can be determined as 1000100 from FIG. 2. The carry sum is left shifted one place and added to the intermediate sum, rendering the sum of 1T100001T. The calculation is set forth in FIG. 3.

FIG. 4 illustrates a functional block diagram the partial product generators 22a–h. Each partial product generator receives input signals including (1) the multiplicand A, (2) the product A*3, and (3) a respective octal digit of the multiplier B. An internal multiplexer 32 selects between the multiplicand A, the product A*3, or zero depending upon the magnitude of the digit of the multiplier B being applied to the partial product generator 22. If the digit of the multiplier B has a magnitude of two or four, the multiplexer selects the multiplicand A and then the shifter 34 shifts the bits of the multiplicand A by one or two places. If the digit of the multiplier B has a magnitude of one, zero, or three, then the appropriate input is passed through without shifting. If the digit of the multiplier B is negative, the sign bits corresponding to bits having a magnitude of one are inverted by the sign bit inversion circuitry 36.

The outputs from the partial product generators 22a–h are connected to their respective first level adders 24a–d, such that the appropriate shifting is provided to account for the significance between the partial products. Similarly, the outputs of the first level adders 24a–d are connected to the respective second level adders 26a–b such that the proper shifting is provided. Likewise, the second level adders 26a–b are connected to the third level adder 28 to provide the proper shifting.

By combining the Octal recoding with the signed digit addition, the layout of the cell is simplified without a reduction in speed caused by the separate magnitude and sign bits. Therefore, the present invention provides the technical advantage of a multiplier circuit having a small layout area without reduced speed.

Although the preferred embodiment of the invention has been shown in detail, it should be understood that various changes, substitutions, and alterations can be made herein without departing from the spirit and scope of the invention.

What is claimed is:

1. A circuit for multiplying a multiplicand by a multiplier, said circuit comprising:
   input means for receiving the multiplicand;
   tripling circuitry coupled to said input means for generating an intermediate product equal to three times the multiplicand;
   recoding circuitry receiving said multiplier and recoding the multiplier into digits of an octal representation;
   partial product generators coupled to said input means, said tripling circuitry, and said recoding circuitry to generate signed digit partial products equal to the digits of the octal representation of the multiplier times the multiplicand;
   adding circuitry coupled to said partial product generators and arrayed as a binary tree to sum the signed digit partial products; and
   conversion circuitry coupled to said adding circuitry to convert the sum of the partial products to a selected numeric representation.

2. The circuit of claim 1 wherein said adding circuitry comprises a plurality of signed digit adders.

3. The circuit of claim 1 wherein the conversion circuitry converts a signed digit number output by said adding circuitry into a binary number.

4. The circuit of claim 1 wherein the conversion circuitry converts a signed digit number output by said adding circuitry into a two's complement number.

5. The circuit of claim 1 further including input conversion circuitry, coupling the input means to the partial product generators, for translating the multiplicand into a signed digit number.

6. The circuit of claim 1 wherein said partial product generators comprise:
   multiplexing circuitry connected to said input means, said tripling circuitry, and said recoding circuitry;
   shifting means connected to said multiplexing circuitry and said recoding circuitry for producing multiples of two and four of the multiplicand in response to the digits of the octal representation of the multiplier having a magnitude of two or four; and
   zeroing means connected to said multiplexing circuitry for outputting a zero in response to multiplier digits having a value of zero.

7. The circuit of claim 6 wherein said partial product generators include inverting circuitry connected to an output of said shifting means and said recoding circuitry to produce an inverted sign of a number.

* * * * *